May 2, 1961  A. L. LEE ET AL  2,982,370
DRIVEN STEERABLE WHEEL ASSEMBLIES FOR MINE HAULAGE
VEHICLES AND BRAKING MECHANISMS THEREFOR
Filed Aug. 31, 1959  10 Sheets-Sheet 10

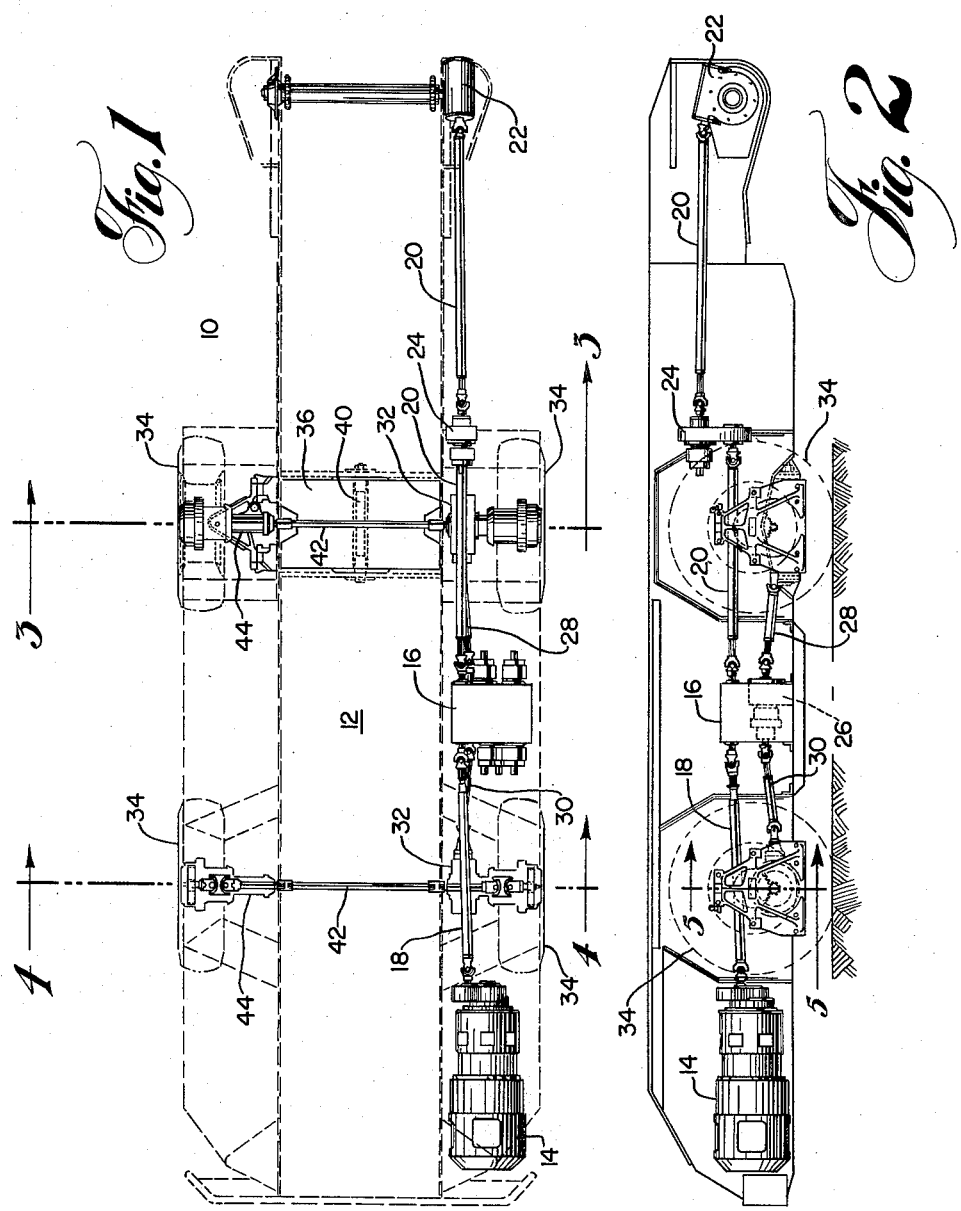

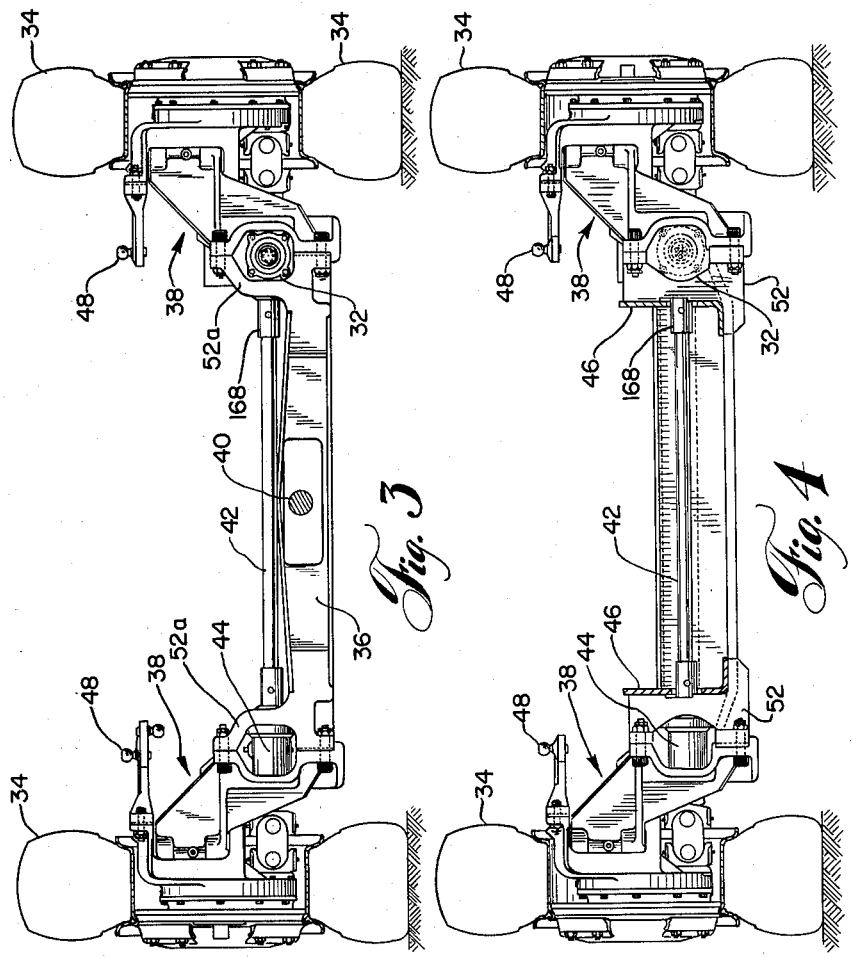

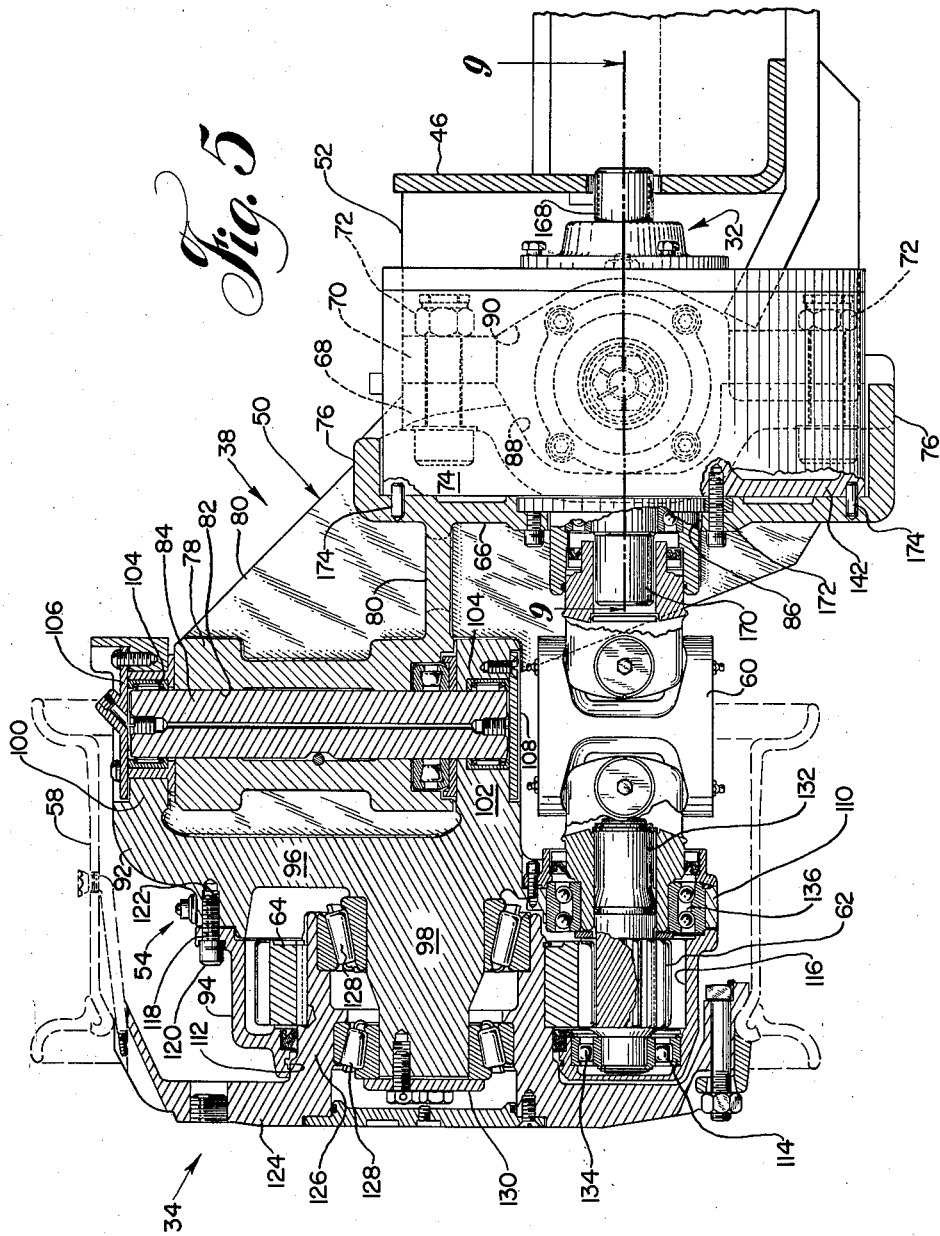

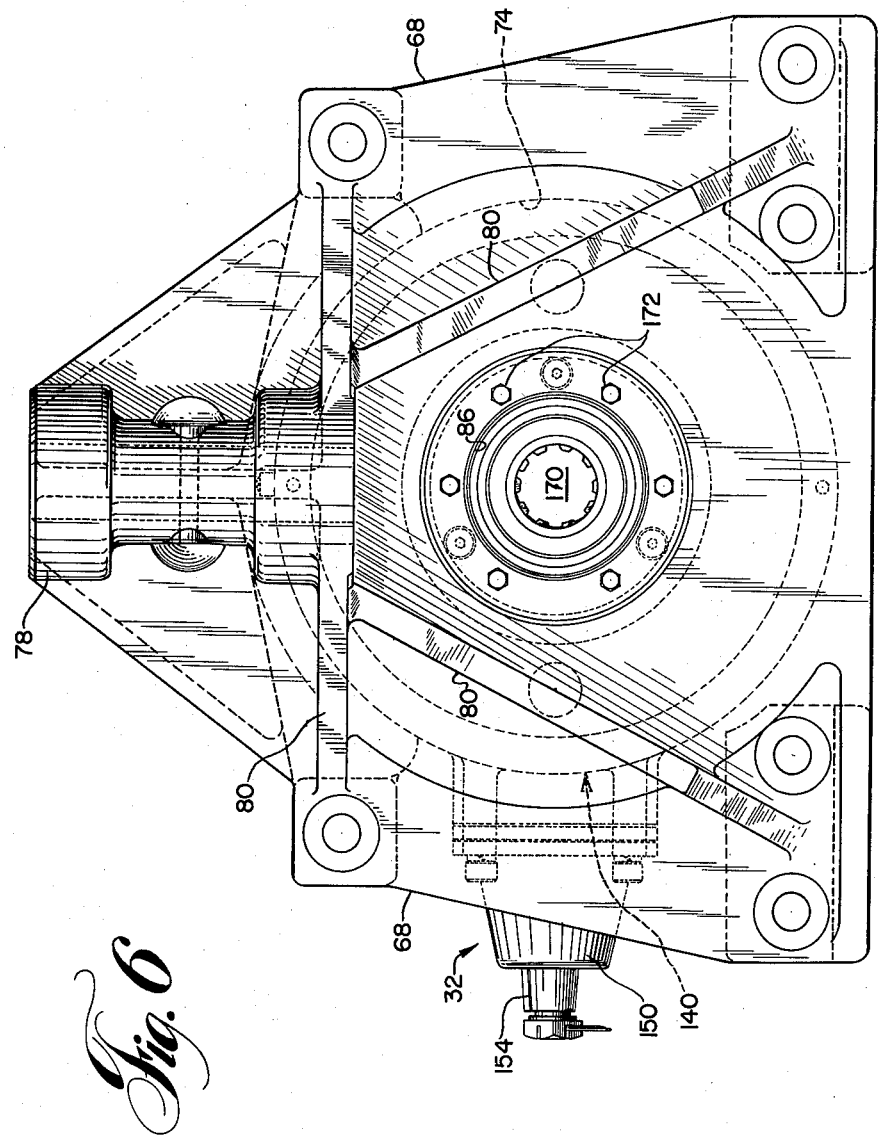

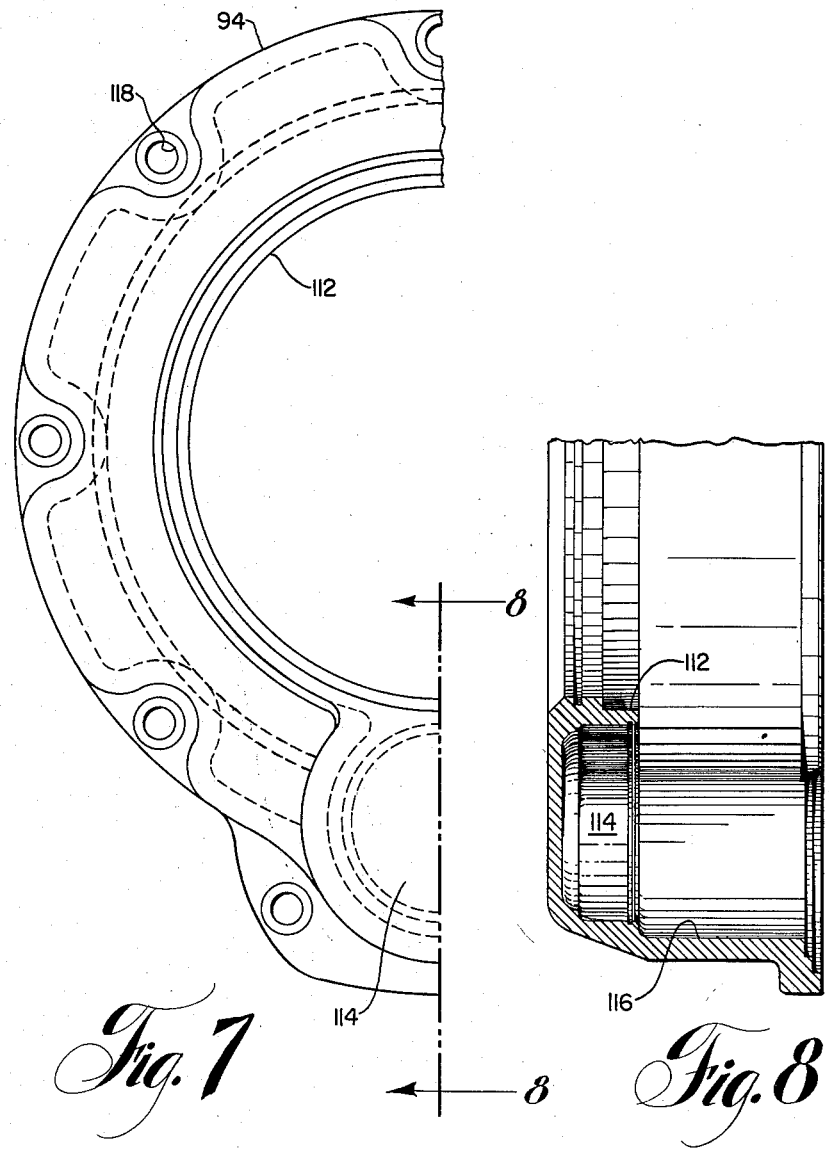

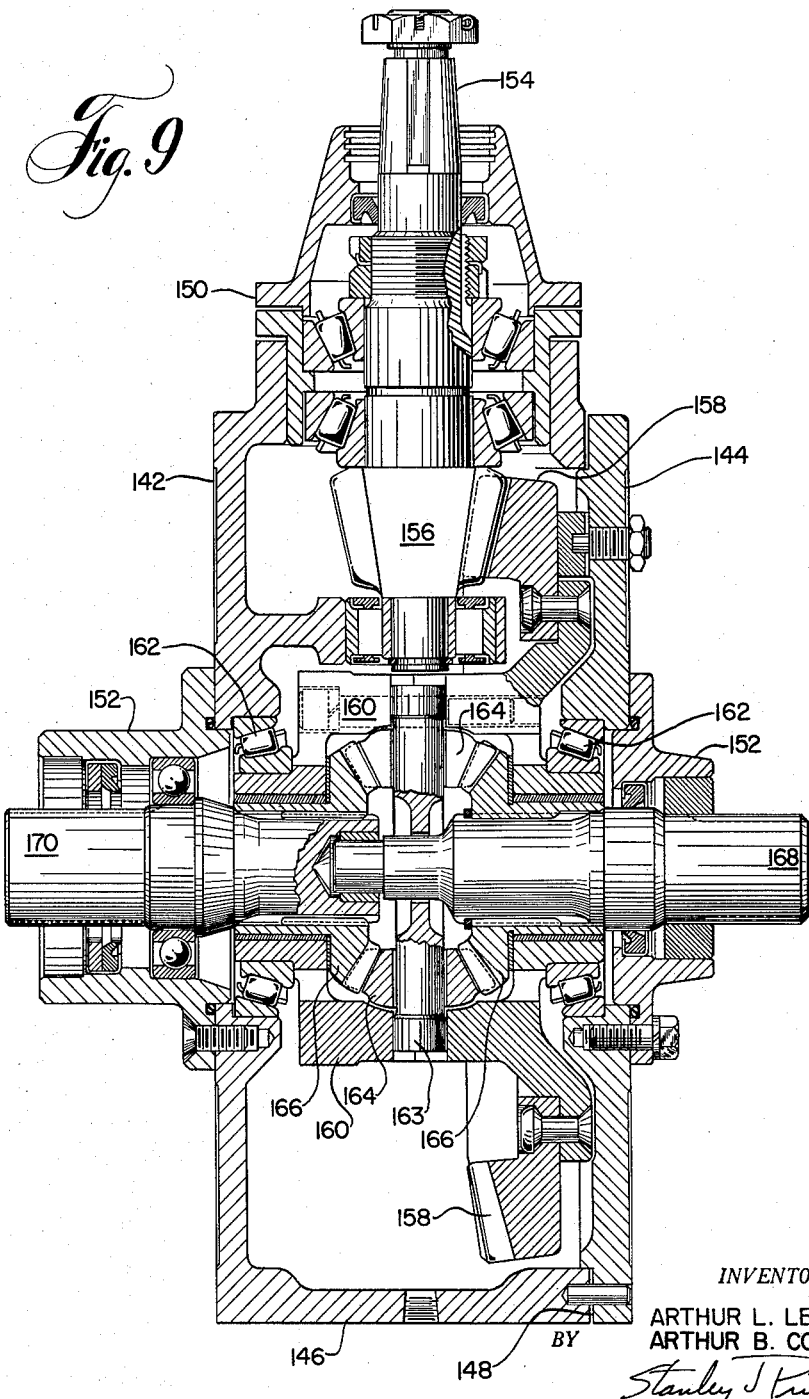

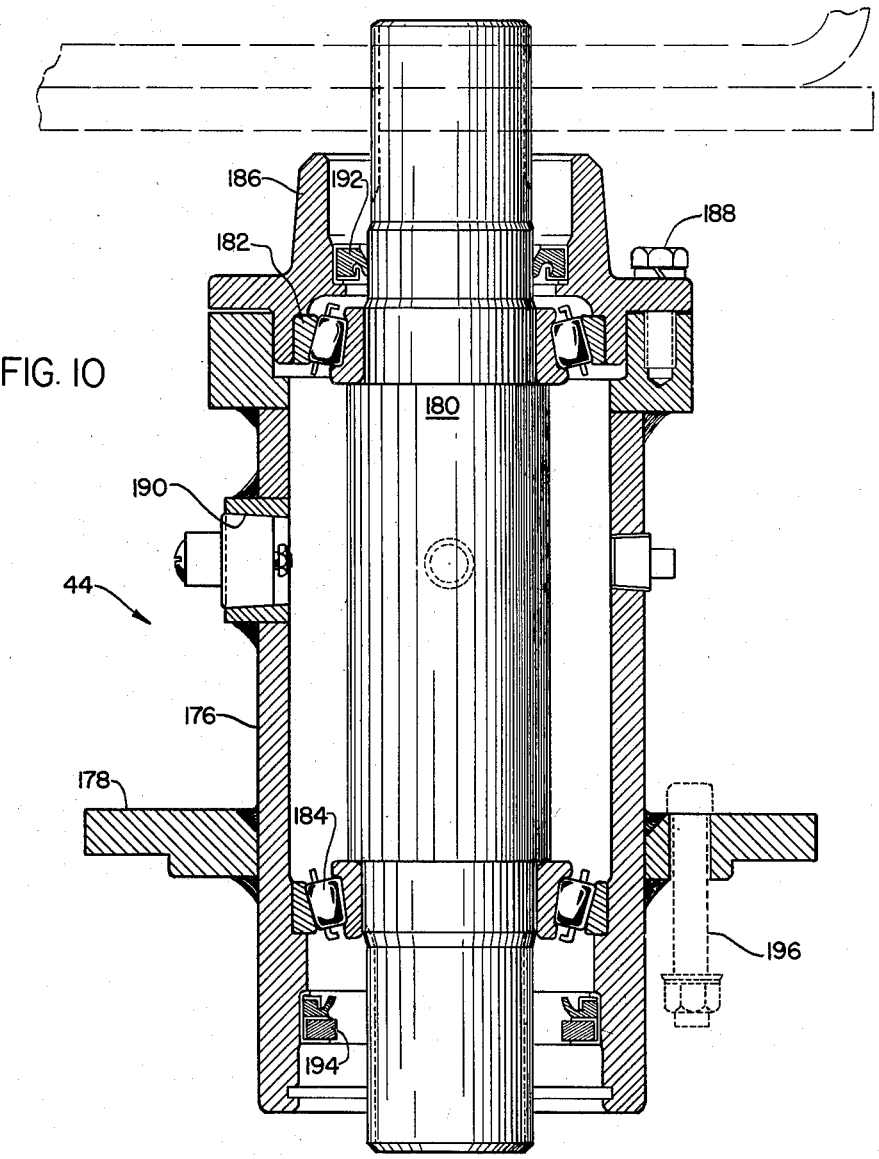

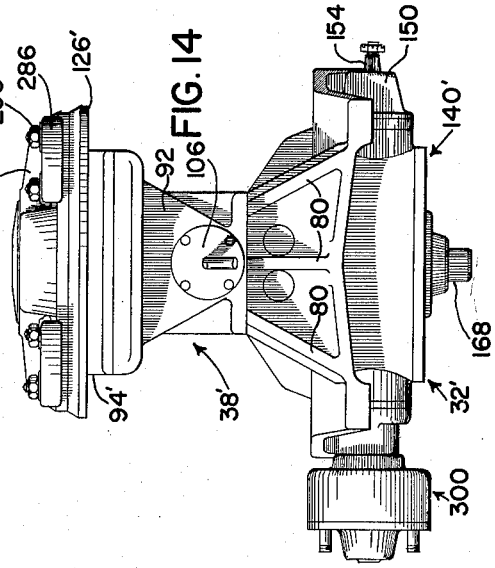
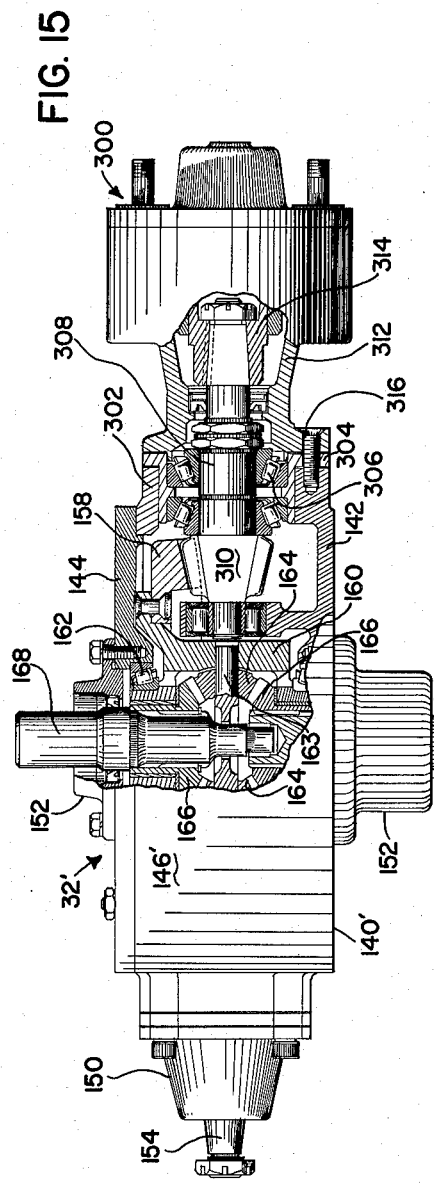
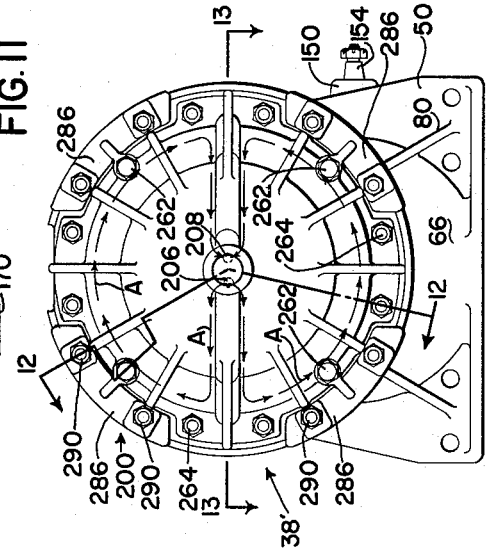

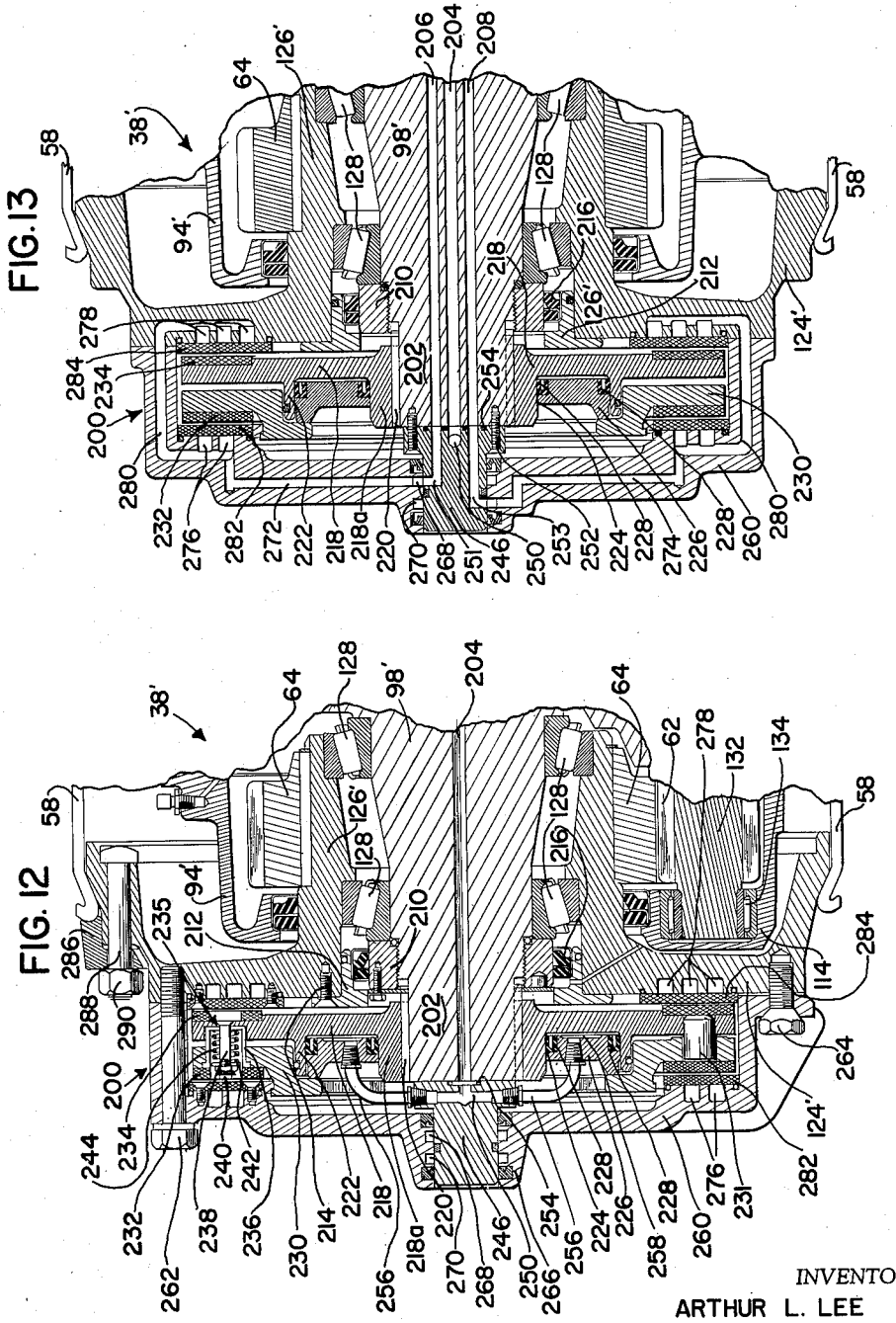

INVENTORS
ARTHUR L. LEE
ARTHUR B. COVAL
BY
Stanley J Price
THEIR ATTORNEY

United States Patent Office 2,982,370
Patented May 2, 1961

2,982,370
DRIVEN STEERABLE WHEEL ASSEMBLIES FOR MINE HAULAGE VEHICLES AND BRAKING MECHANISMS THEREFOR

Arthur L. Lee and Arthur B. Coval, Columbus, Ohio, assignors to Consolidation Coal Company, Pittsburgh, Pa., a corporation of Pennsylvania Filed Aug. 31, 1959, Ser. No. 837,103

10 Claims. (Cl. 180—43)

This invention relates to a four wheel driven and four wheel steered type haulage vehicle and more particularly to the power driven and steerable wheel assemblies mounted on the vehicle frame and to effective braking means therefor.

As the size and weight of haulage vehicles increases, effective braking means to control the speed of such vehicles become of critical importance. Because of the great weight of such vehicles, tremendous amounts of heat energy are generated by their friction braking means. This heat often causes distortion and variation in the size and shape of the brake parts and so causes brake "fade," or the inability of the brake to effectively compensate for the changes due to heat.

In order to overcome the problems of brake heating, brakes may be provided with structures to dissipate the heat generated during the braking action. Thus, if some brake cooling means is provided, the brakes will operate more effectively.

Another method of reducing brake heating problems is to reduce the amount of braking force that the brake need apply. Thus, if other means are utilized to reduce the speed of the vehicle initially, the total heat energy produced by the brake will be materially reduced.

With the foregoing considerations in mind, it is a principal object of the present invention to provide highly efficient braking mechanisms for the power driven and steerable wheel assemblies mounted on the vehicle frame of a four wheel driven and four wheel steered type haulage vehicle.

It is another object of the present invention to provide an efficient liquid cooled brake which may be operatively located between the rotating wheel and the fixed spindle of a power driven and steerable wheel assembly.

Another object of the present invention is to provide improved wheel assemblies for haulage vehicles that include effective braking means and which are freely interchangeable.

A further object of this invention is to provide an effective braking means operatively associated with the differential mechanism to provide a braking force to either pair of wheels.

Another object of this invention is to provide a brake associated with the differential wherein the brake is liquid cooled to provide higher efficiency.

Another object of this invention is to provide a brake mechanism operatively associated with the drive gearing of the power driven steerable wheel assembly to exert a braking force on the wheel.

A still further object of this invention is to provide brake mechanisms that may be operatively located at three separate and distinct points on the power driven and steerable wheel assemblies so that they may be utilized simultaneously to reduce the braking force required from each.

Another object of this invention is to provide brake mechanisms that may be operatively located at three separate and distinct points on the power driven and steerable wheel assemblies and which need not be utilized simultaneously.

These and other objects of this invention will become apparent as this description of the invention proceeds.

This application is a continuation-in-part of copending application, Serial No. 642,431, filed February 26, 1957, entitled "Driven Steerable Wheels for Mine Haulage Vehicles" and since issued as Patent No. 2,924,288.

This invention comprises the new and improved construction and combination of parts and their operating relation to each other which will be described more fully hereinafter and the novelty of which will be particularly pointed out and distinctly claimed.

In the drawings:

Figure 1 is a top plan view of a shuttle car illustrating the driving connections between the prime mover and the four wheel assemblies.

Figure 2 is a view in elevation similar to Figure 1.

Figure 3 is a view in vertical section taken along the line 3—3 in Figure 1 illustrating the drive connection between a pair of wheels on opposite sides of the haulage vehicle.

Figure 4 is a view in vertical section taken along the line 4—4 in Figure 1 illustrating the driving connection between the other pair of wheels positioned on opposite sides of the haulage vehicle.

Figure 5 is a detail sectional view taken along the line 5—5 in Figure 2 illustrating a wheel assembly with the differential mechanism positioned between the wheel assembly and the vehicle frame.

Figure 6 is a view in front elevation of the supporting bracket and differential mechanism illustrated in Figure 5.

Figure 7 is an enlarged fragmentary view in elevation of the spindle bracket cover shown in Figure 5.

Figure 8 is a sectional view taken along the line 8—8 in Figure 7 showing in detail the outboard bearing carrier portion of the spindle bracket cover.

Figure 9 is a sectional plan view taken along the lines 9—9 in Figure 5 illustrating in detail the differential mechanism.

Figure 10 is an enlarged view in section illustrating the bearing carrier member.

Figure 11 is a front elevational view of a wheel assembly, with the wheel removed, similar to the wheel assembly of Figures 5–9, modified to receive a disc brake.

Figure 12 is a developed sectional view of the modified wheel assembly of Figure 11 taken on line 12—12 of Figure 11.

Figure 13 is a horizontal sectional view of the modified wheel assembly of Figures 11–12, taken along line 13—13 of Figure 11, showing details of the brake cooling system.

Figure 14 is a top plan view of a wheel assembly with the rim removed and showing a modified differential with a disc brake operatively associated therewith.

Figure 15 is a plan view, partially in section, similar to Figure 9, showing details of the modified differential and disc brake of Figure 14.

Throughout the drawings like reference numerals refer to like parts and a prime suffix affixed to a reference numeral indicates a modified configuration of the part bearing the original number.

Figure 16:
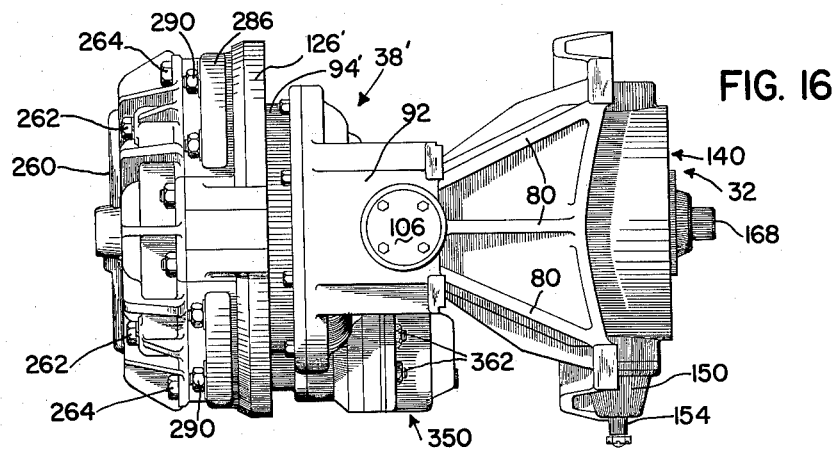
Figure 16 is a top plan view of a modified wheel assembly with the rim removed, showing a disc brake operatively associated with the drive gearing of the wheel assembly.

Referring to the drawings, and particularly to Figures 1 and 2, there is illustrated a haulage vehicle 10 having a material receiving portion 12 extending lengthwise thereof. The material haulage portion 12 is provided with a conveyor means (not shown) adapted to discharge the material therefrom. The haulage vehicle 10 is provided with a prime mover 14, which in this instance is an electric motor. The prime mover 14 is connected to a transmission 16 by means of a propeller shaft 18. The transmission 16 is adapted to provide a plurality of speeds in both directions while the prime mover 14 maintains a constant output speed. Auxiliary output shafting 20 is connected at one end to the transmission 16 and at its other end to a conveyor drive mechanism 22. A clutch member 24 controls the drive of the conveyor drive mechanism 22. The transmission 16 includes a differential diagrammatically indicated at 26 which is driven by the output gear of the transmission and provides differential drive for the longitudinally extending output shafts 28 and 30. The output shafts 28 and 30, though driven through differential 26, both rotate in the same direction. The output shaft 28 extends toward the front end of the shuttle car 10 and is connected at its free end to a differential mechanism 32. Similarly the output shaft 30 extends longitudinally toward the rear of the haulage vehicle 10 and is connected to another differential 32 which is similar in construction to the first named differential.

The haulage vehicle 10 is propelled by a front pair of driven wheels 34 and a rear pair of driven wheels 34 which receive their driving power from a single prime mover 14. The front wheels 34 are a part of a pair of duplicate wheel assemblies 38 which are detachably secured to the opposite ends 52a of an equalizer axle 36 (Fig. 3). The equalizer axle end portions 52a are similar in shape to securing brackets 52 later described. The equalizer axle 36 is connected to the haulage vehicle 10 by means of the longitudinally extending pin member 40. A transverse shaft 42 connects the differential 32 with a bearing carrier 44. Power delivered from the prime mover 14 is transmitted through the longitudinally extending output shaft 28 to the differential 32 (Figs. 1 and 2) and from the differential 32 to the adjacent wheel assembly 38, as will be later explained, and to the opposite wheel assembly by means of the transverse shaft 42, as will also be later explained. The rear pair of wheels 34 are positioned adjacent to the side walls of haulage vehicle frame 46 and are a part of the wheel assemblies 38 which are identical in construction to the pair of front wheel assemblies 38. The rear wheel assemblies 38 are detachably secured to securing brackets 52 and the securing brackets 52 in turn are rigidly secured to the haulage vehicle frame 46. In a similar manner power is delivered from the prime mover 14 through the transmission 16 to the other longitudinally extending output shaft 30 (Figs. 1 and 2). The output shaft 30 is connected at its free end to the other differential 32 to provide power to the adjacent wheel 34 and power to the opposite wheel 34 by means of the transverse shaft 42 and bearing carrier 44. It should be noted that the transverse power delivery shafts 42 extend below the horizontal axis of the wheels 34 thus providing additional haulage area within the material haulage portion 12. Each of the wheel assemblies 38 are provided with steering arms 48 which are interconnected to each other by a steering mechanism (not shown) so that the four wheels are both power driven and steerable.

Figure 5 illustrates in detail a wheel assembly 38, which includes a wheel 34, detachably secured to a securing bracket 52. Since this is a view of a rear wheel assembly, the securing bracket 52 is rigidly secured to the vehicle frame 46 as by welding or the like.

It should again be noted in regard to Figure 3 that the transverse equalizer axle 36 has end portions 52a which are formed as duplicates of the securing brackets 52 but in this instance the securing bracket portions 52a are integral with the equalizer axle 36 and not secured to the vehicle frame portions 46 as illustrated in Figure 4.

The wheel assembly 38 has a supporting bracket 50 and a spindle bracket assembly 54 pivotally connected thereto. The wheel 34 is rotatably positioned on the spindle bracket 54 and has a conventional wheel rim 58 mounted thereon. The wheel 34 is driven by the differential mechanism 32 through a universal joint 60 and a pinion gear 62 supported by the spindle bracket assembly 54. A large ring gear 64 is secured to the wheel 34 and is in meshing relation with the small pinion gear 62 so that upon rotative movement of the pinion gear 62 the wheel 34 is driven by means of the large ring gear 64. Throughout this specification the term wheel assembly includes at least the following structure: wheel 34, wheel rim 58, supporting bracket 50, spindle bracket 54, universal joint 60 and drive gearing 62 and 64, and may also include the differential 32.

In the wheel assembly 38 the wheel 34 is steerable by means of the pivotal connection between the supporting bracket 50 and the spindle bracket assembly 54 and is driven by means of the power connection described. It should be noted that both the pivotal connection and the drive gearing are substantially within the lateral limits of the wheel rim 58 thus providing a compact wheel assembly that may be positioned closely adjacent the vehicle frame so that the vehicle may be operated in confined spaces.

Referring in detail to the strcture disclosed in Figure 5, there is shown a supporting bracket 50 having a vertically extending body portion 66 with a pair of spaced vertical flange portions 68. The flange portions 68 are rigidly and detachably connected to outwardly extending flange portions 70 of the securing bracket 52 by means of bolts 72 thereby rigidly and detachably securing the supporting bracket 50 to the securing bracket 52. The flange portions 68 form a recessed portion indicated at 74 therebetween. The supporting bracket body portion also has a pair of spaced inwardly extending horizontal flange portions 76 which form with the vertical flange portion 68 a cylindrical recessed portion 74 in the body portion 66. The recessed portion 74 is cup shaped with the supporting bracket body portion 66 forming an end wall for the recessed portion 74. The cup shaped recessed portion 74 has its open end portion facing the vehicle frame 46. The supporting bracket 50 has a king pin receiving portion 78 extending outwardly and upwardly therefrom. A plurality of reinforcing rib members 80 rigidly connect the king pin receiving portion 78 to the supporting bracket body portion 66. The king pin receiving portion 78 has a vertical cylindrical bore 82 therethrough which is adapted to receive king pin 84.

The supporting bracket body portion 66 has a horizontal bore 86 therethrough and the vertical flange portions 68 have a cut away portion or passage 88. Similarly the securing bracket 52 has a cut away portion or passage 90 which is aligned with the cut away portion 88 in the supporting bracket 50. The spindle bracket assembly 54 includes a spindle bracket 92 and a spindle bracket cover 94. The spindle bracket 92 has a body portion 96 with a spindle member 98 extending outwardly therefrom and a pair of horizontally spaced flange portions 100 and 102 extending inwardly therefrom.

The flange portions 100 and 102 have a pair of vertically aligned apertures 104 therethrough. The supporting bracket king pin receiving portion 78 is positioned between the spindle bracket flange portions 100 and 102 with the cylindrical bore aligned with the spindle bracket apertures 104. A king pin 84 is positioned in the aligned apertures and bore and secured therein by means of cap members 106 and 108. In this manner the spindle bracket 92 is pivotally secured to the supporting bracket 50 along substantially vertical axis.

The spindle bracket body portion has an annular bearing carrier portion 110 arranged below the spindle 98.

The spindle bracket cover 94 is dish shaped (Figs. 5, 7 and 8) and has a central aperture 112 therethrough. The spindle bracket cover 94 also has an outboard bearing supporting portion 114 positioned below the aperture 102 and a pinion gear receiving portion 116. The bearing supporting portion 114 and pinion gear receiving portion 116 are axially aligned with the spindle bracket annular bearing carrier portion 110. The spindle bracket cover member 94 has a plurality of apertures 118 therethrough around its outer periphery and is secured to the spindle bracket 92 by means of bolts 120 extending therethrough and into aligned threaded bores 122 in the spindle bracket 92.

The wheel 34 has a body portion 124 with a cylindrical hub portion 126 extending inwardly therefrom. The wheel hub portion 126 is suitably supported on roller bearings 128 positioned on the spindle 98 so that the wheel member 34 is rotatable relative to the spindle 98. A cap member 130 retains the bearing 128 in proper position on the spindle 98. The wheel hub 126 has an annular external toothed ring gear 64 rigidly secured thereto for rotation therewith. As stated, the wheel member 34 has a conventional wheel rim 58 secured to its outer periphery. It should again be noted at this point that the wheel assembly 38 is so constructed that both the king pin 84 and the driven gear 64 are confined substantially to the lateral limits of the wheel rim 58 to present a compact driven and steerable wheel assembly of limited lateral dimension.

A power transmitting shaft 132 is rotatably supported at its outboard end by means of roller bearing 134 positioned within the spindle cover outboard bearing supporting portion 114. The inboard end of the shaft 132 is rotatably supported in bearing 136 secured to the spindle bracket annular bearing carrier portion 110. The pinion gear 62 is splined to the power transmitting shaft 132 and is positioned in the pinion gear receiving portion 116. The pinion gear 62 is in meshing relation with the large ring gear 64 which is secured to the wheel hub 126. A universal joint 60 connects the inboard end of the shaft 132 with a transverse output shaft of the differential 32 so that output drive power from the differential 32 is transmitted through the universal joint 60 and power transmitting shaft 132 to pinion gear 62 and the large ring gear. It should be noted that the universal joint 60 is positioned below and in vertical alignment with the longitudinal axis of king pin 84.

The differential 32 illustrated in Figures 5, 6 and 9 has a cylindrical carrier 140 with circular side walls 142 and 144. The side wall 142 has a circular inwardly extending circumferential flange portion 146 which abuts the inner circumferential edge 148 of the other side wall 144 thus forming a cylindrical carrier. As will be later described, the differential carrier 140 supports the various gears, shafts and bearings of the differential 32 so that it is a self-contained sealed unit adapted to retain a separate supply of lubricant for the differential 32. The circular flange portion 146 has a differential power input shaft receiving portion 150 extending therefrom. The side walls 142 and 144 have output shaft supporting portions 152 extending therefrom along the longitudinal axis of the carrier.

The view of Figure 9 is taken along the line 9—9 of Figure 5 which in turn illustrates the arrangement of the wheel assembly 38 as it is connected to a rear wheel 34. The power output shaft 30 from the transmission 16 is connected to the power input shaft 154 of the differential 32 which is rotatably supported in the input shaft housing 150. A bevel gear 156 is secured to the end of the differential power input shaft 154 and is in meshing relation with a large bevel ring gear 158. The ring gear 158 has a housing portion 160 which is rotatably supported on bearing 162 to rotate along an axis transverse to the axis of the differential power input shaft 154. A differential cross 163 extends through and is secured to the housing portion 160 which is rotatably secured on bearing 162. Planet type bevel gears 164 are rotatably secured to the arms of the cross 163 and are in meshing relation with a pair of bevel gears 166. The gears 166 are secured to transversely extending power output shafts 168 and 170. In Figure 5 transverse shaft 170 is connected to the universal connecting means 60.

The other transversely extending output shaft 168 is connected to the transverse shaft 42 and provides differential drive for the opposite wheel assembly 38 through the bearing carrier 44. As described the differential carrier side wall 142 is secured to the inner wall of the supporting bracket body portion 66 by means of a plurality of bolts 172. The pin members 174 (Fig. 5) adjacent the inwardly extending horizontal brackets 76 restrain the differential carrier 140 from rotation.

In order to provide proper drive for the vehicle 10 the pair of transverse shafts 42 (Fig. 1) must rotate in the same direction. Since the power output shafts 28 and 30 from the transmission differential 26 are arranged to rotate in the same direction, a reversal in the direction of rotation must be made between one of the output shafts 28 or 30 and one of the transverse shafts 42. This is accomplished in this vehicle by employing a pair of differentials of identical construction housed in identical carriers and having in one instance the differential 32 secured to the supporting bracket 50 by the carrier side wall 142 (rear wheels) and in the other instance (front wheels) the differential 32 secured to the supporting bracket 50 by the carrier side wall 144. Thus, as in Figure 1, the large ring gear 158 would be adjacent the wheel assembly 38 in the rear wheels and would be adjacent the vehicle frame in the differential 32 driving the front wheels. In this manner the ring gear 158 would be on the outboard side of the differential for the rear wheels and on the inboard side of the differential for the front wheels. With this arrangement identical differentials 32 in identical carriers 142 are employed for both the front and rear wheels and yet the effective direction of rotation of one of the longitudinally extending power output shafts 28 or 30 can be reversed so that both transverse shafts 42 and the gearing in the wheel assemblies 38 connected thereto rotate in the proper direction.

As shown in Figures 1, 3 and 4 the transverse shaft 42 is connected at one end to a differential output shaft 168 and at the other end to a bearing carrier 44. The bearing carrier 44 is illustrated in detail in Figure 10 and has a cylindrical housing 176 with a securing flange 178 extending radially therefrom. A connecting shaft 180 is rotatably supported within the housing 176 by bearings 182 and 184. The bearing 182 is positioned in a cap member 186 that is detachably secured to the housing 176 by means of bolts 188. An aperture 190 is provided in the housing 176 to provide a means for lubricating bearings 182 and 184. Ring members 192 and 194 seal the open ends of the housing 176 to retain the lubricant therein.

The bearing housing 176 is secured to the wheel assembly supporting member body portion 66 in the same manner as the differential 32. Bolts 196 extend through the apertures in the supporting bracket body portion 66 and the bearing housing flange 178 to detachably secure the bearing carrier 44 to the wheel assembly 38.

With this arrangement the driving connections between a pair of wheel assemblies 38 on opposite sides of the vehicle include a differential 32, a transverse shaft 42 and a bearing carrier 44. The positioning of the bearing carrier 44 and the differential 32 is a matter of choice and is dependent only upon the relative position of the power input shafts. Thus, with our new drive means, a modification of the haulage vehicle to change the position of the prime mover and transmission to the opposite side of the vehicle would simply require reversing the relative positions of the bearing carrier 44 and the differential carrier 140.

From the foregoing description of our drive means it is apparent that all wheel assemblies 38, differentials 32 in carriers 140 and bearing carriers 44 are interchangeable, thus minimizing the spare parts inventories, and eliminating possible error in assembly or repair of the vehicle drive means. Wheel assembly 38 may be easily lubricated while the wheel 34 is mounted thereon. Also, the drive gearing for the wheel and the differential mechanism are housed within separate enclosures so that the lubricant within these enclosures remains substantially free of contamination from dust or other contaminants. This feature of the wheel assembly reduces the wear of moving parts and assures longer trouble free performance of the vehicle.

Although both the differential and bearing carrier have been described as being detachably secured to the wheel assembly supporting bracket body portion, it should be understood that the differential 32 or the bearing carrier 44 could be secured, with equal ease, to the vehicle frame side portions 46.

As described thus far, the novel wheel assemblies 38 have no braking means associated therewith. The wheel assemblies 38 may be modified slightly to receive highly efficient disc brakes without any loss of the many advantages gained by the wheel assemblies described thus far as enumerated in the foregoing portions of the specification.

The braking means may be operatively associated with the wheel itself to provide a braking force between the wheel 34 and the spindle 98 as shown in Figures 11–13. The braking means may be operatively associated with the differential 32 to provide a braking force between the differential and its carrier 140 and so provide a braking force to a pair of wheel assemblies 38 as shown in Figures 14–15. The braking means may also be associated with the drive gearing 64 of the wheel assemblies 38 to provide braking force at that point.

These individual braking means may be utilized alternately or simultaneously as dictated by the size and weight of the vehicle and use to which it will be put. When utilized simultaneously the braking means reduce the wear of any single braking component thus producing an improved overall system. Further, the cooling of the three individual braking means is more easily accomplished since they are physically removed from each other. Thus, a lesser amount of heat is produced at three separate locations rather than the production of a high intensity heat source in a concentrated area.

Referring now to Figures 11, 12 and 13 it will be seen that a disc brake 200 has been added to the modified wheel assembly 38'. Figures 12 and 13 are partial sections of the outboard portion of the wheel assembly 38'. Wheel assembly 38' is generally similar to wheel assembly 38 previously described in reference to Figure 5. As seen in Figure 12, the spindle member 98 of the previously described wheel assembly has been modified by lengthening the spindle member 98' to include the extended portion 202 of the spindle member. The modified spindle portion 98' supports roller bearings 128 as is also shown in Figure 5. The roller bearings 128 of Figure 12 support a modified wheel body portion 124' which has a cylindrical hub portion 126'. The modifications to the wheel body portion 124 which produce the modified wheel body portion 124' shown in Figure 12 will be later described.

The modified spindle member 98' has three longitudinally extending passages 204, 206 and 208 as best seen in Figure 13. Passage 204 is a hydraulic actuating passage, while passages 206 and 208 are the coolant inlet passage and coolant return passages respectively. The function of these passages will become apparent as this description proceeds. Retaining roller bearing 128 in place on spindle member 98' is a bearing retainer ring 210 which is threadingly received upon the spindle member 98'. A bearing seal ring 212 is bolted to the wheel body portion 124' by bolts 214 (Fig. 12). An annular seal element 216 is disposed between the bearing retainer ring 210 and the bearing seal ring 212 to form a running seal between the spindle member 98' and the wheel body portion 124' to retain the lubricant in the bearings 128.

A brake disc 218 having a hub 218a is non-rotatably secured to the spindle member 98' through a splined connection 220 between the brake disc hub 218a and the extended portion 202 of the spindle member 98'. The splined connection 220 allows the brake disc 218 to be moved axially with respect to the spindle member 98' but prevents relative rotation between brake disc 218 and spindle member 98'. The brake disc 218 has an annular wall 222 extending outwardly therefrom. The annular wall 222 along with the brake disc hub 218a form an annular recess 224 in the brake disc. Disposed within the annular recess 224 is an annular piston 226. Annular piston sealing elements 228 cooperate with the annular piston 226 to provide a fluid seal between the piston 226 and the walls of the annular recess 224.

A second annular brake disc 230 is non-rotatably secured to brake disc 218 by a plurality of dowel pins 231. This brake disc 230 is in abutting relationship with the non-working face of piston 226 as best shown in Figure 12. The dowel pins 231 prevent relative rotation between brake discs 218 and 230 but allow axial movement of the brake discs with respect to each other. Annular friction discs 232 and 234 are fixedly secured to the faces of brake discs 230 and 218 respectively. These friction discs 232 and 234 are the working brake faces of the brake discs 218 and 230.

The brake discs 218 and 230 are spring loaded to move toward each other when not actuated by hydraulic pressure. A plurality of spring control units, one of which is shown generally at 235 on Figure 12 are disposed about the periphery of brake discs 218 and 230 to bias the brake discs toward each other. Each of the spring control units 235 consists of a cylindrical cup 236 press fitted into the brake discs 230. A bolt 238 secured to the brake discs 218 protrudes axially through cup 236. A helical spring 244 is disposed over bolt 238 so that spring 244 abuts the bottom of the cup 236. A backing washer 242 and a nut 240 are placed on bolt 238 so that the backing washer 242 is in abutting relation with the other end of the helical spring 244. Thus, when the helical spring 244 tends to expand, it forces the bottom of the cup 236 and the backing washer 242 apart so that it draws the brake discs 218 and 230 toward each other.

A cylindrically shaped conduit junction 246 containing a T shaped passage 250 and L shaped passages 251 and 253 is non-rotatably secured to the end of the spindle member 98' by bolts 252 as is shown in Figure 13. The base of the T shaped passage 250 is aligned with and communicates with the hydraulic passage 204 in the spindle member 98'. The L shaped passages 251 and 253 communicate with the coolant inlet passage 206 and coolant return passage 208 respectively in the spindle member 98'. O-ring seals 254 are disposed between the conduit junction 246 and the spindle member 98' to seal the connecting points of the respective passages. Hydraulic conduits 256 communicate with the open ends of the T shaped passage 250 and are joined at their other ends to the annular piston 226 so that the T shaped passage 250 is placed in fluid communication with the annular brake chamber 258 formed between the brake piston 226 and the brake disc 218.

A dish shaped brake housing 260 is placed over the end of the wheel assembly and bolted to the wheel body portion 124' by a plurality of bolts 262 and a plurality of bolts 264. The brake housing 260 has a hub portion 266 which has a cylindrical internal surface. The internal cylindrical surface of hub portion 266 is in close clearance with the conduit junction 246. Since the brake housing 260 rotates as a unit with the wheel body portion 124 about the fixed spindle member 98', relative rotation takes place between the conduit junction 246 and the internal cylindrical surface of the brake housing hub portion 266. Formed within the hub portion 266 are two annular chambers 268 and 270. The annular coolant inlet chamber 268 communicates with the L shaped passage 251 in conduit junction 246 as is best shown in Figure 13. The annular coolant outlet chamber 270 communicates with passage 253 as is also shown in Figure 13. Formed within the wall of brake housing 260 are radial coolant inlet passage 272 and radial coolant outlet passage 274. These radial passages 272 and 274 communicate with the annular coolant inlet chamber 268 and annular coolant outlet chamber 270 within the hub portion 266. Formed near the periphery of the brake housing 260 are annular coolant passages 276. The radial passages 272 and 274 communicate with the annular coolant passages 276. Annular coolant passages 278 are formed in the modified wheel body portion 124' as is shown in Figures 12 and 13. Coolant connecting passages 280 in radial alignment with passages 272 and 274 join the annular coolant passages 276 in the brake housing 260 to the annular coolant passages 278 in the modified wheel body portion 124'.

An annular friction disc 282 is fixed to the brake housing 260, and an annular friction disc 284 is fixed to the wheel body portion 124'. These friction discs 282 and 284 serve as brake working surfaces. It will be noted that the coolant passages 276 and 278 in the brake housing 260 and the modified wheel body portion 124' respectively are formed as open grooves. The annular friction discs 282 and 284 are then fixed to the brake housing 260 and the wheel body portion 124' respectively to form the complete passages 276 and 278. Thus, the coolant fluid passing through passages 276 and 278 is in actual contact with the back surface of the annular friction discs 282 and 284 to provide more effective heat transfer from these braking surfaces.

Referring to Figure 11, the arrows labeled A show the pattern of coolant flow through the brake housing 260 and the modified wheel body portion 124'. As the pattern there indicates, the coolant enters axially of the spindle 98' and passes through the coolant inlet passage 206 to the conduit junction 246. There it passes through L shaped passage 251 into radial coolant inlet passage 272. The coolant then circulates about the periphery of the brake housing 260 and the modified wheel body portion 124' through the annular coolant passages 276 and 278. The coolant circulates in both directions to a diametrically opposed point on the periphery of the brake housing 260 where it enters the coolant outlet passage 274 and is carried back to the L shaped passage 253 in conduit junction 246. The coolant passes from the conduit junction 246 through the coolant return passage 208 to some appropriate heat exchanger.

The conventional rim 58 is secured to the modified wheel body portion 124' by the rim securing elements 286 which are bolted to the modified wheel body portion 124' by bolts 288 and nuts 290.

With the foregoing description of the brake structure between the spindle member 98' and the wheel body portion 124' in mind, the operation of this brake will become readily apparent. As stated previously, the wheel body portion 124' carrying the rim 58, and the brake housing 260 rotate as a unit on bearings 128 about the spindle 98'. The brake housing 260 carries annular friction disc 282 and the modified wheel body portion 124' carries the annular friction disc 284. The fixed spindle 98' has the brake disc 218 non-rotatably secured thereto but free to move axially with respect to the spindle portion 98'. The brake disc 230 is non-rotatably fixed to the brake disc 218 but is free to move axially with respect to the brake disc 218. The brake discs 218 and 230 are biased toward each other. Annular friction discs 232 and 234 are non-rotatably secured to brake discs 230 and 218 respectively.

When the vehicle is in motion and the wheel member 124' is rotating with respect to spindle 98', and it is desired to apply a braking force to wheel 124', hydraulic fluid under pressure is conducted into the inboard end of passage 204. The hydraulic brake system which produces the source of hydraulic fluid under pressure is not shown and forms no part of the present invention in that it may be conventional in all respects. The fluid under pressure in hydraulic passages 204 passes into the T shaped passage 250 from whence it is conducted through hydraulic conduits 256 to the annular brake chamber 258 between piston 226 and brake disc 218. This hydraulic pressure then forces piston 226 and brake disc 218 apart. Since the piston 226 is in abutting relation with brake shoe 230 at its rear face, the hydraulic pressure forces the brake shoes 218 and 230 apart. The brake discs 218 and 230 are forced apart against the force of the biasing springs 244 which tend to keep them together. When forced apart, the brake shoes 230 and 218 move until the annular friction discs 232 and 234 come into contact with the friction discs 282 and 284 respectively fixed to the brake housing 260 and the wheel body portion 124'.

Coolant under pressure may be forced into the coolant inlet passage 206 from whence it passes into the L shaped passage 251 and on to the radial coolant inlet passage 272. The coolant is then circulated through the annular passages 276 and 278 in direct heat transferring relation with the annular friction discs 282 and 284. The heat transferred to the coolant from the discs is then carried to the radial coolant outlet passage 274 through the L shaped passage 253 and back to the coolant return passage 208. The coolant system may have a coolant pump to provide coolant under pressure and may have a heat exchanger to provide for cooling of the coolant once it is heated by heat transfer from the friction discs. These elements form no part of the present invention and are not shown. They may be conventional in all respects. The coolant can be any suitable liquid such as water or the like. The disc brake 200, then, provides a highly effective liquid cooled brake between the fixed spindle 98' and the rotating wheel of the wheel assembly 38'.

Referring now to Figures 14 and 15, a modified wheel assembly 38' is shown in Figure 14 with a disc brake 300 operatively associated with the differential 32' of the modified wheel assembly 38'. Figure 15 shows the modified differential 32' which has been modified to receive the disc brake 300. Figure 15 is a detailed drawing partially in section similar to the drawing of Figure 9. The differential of Figure 15 operates in a manner generally similar to the differential shown in Figure 9 and is constructed almost identically to the differential of Figure 9 except for the modification to be described in detail hereafter. The driving connection between the differential 32' of Figure 15 is identical to that of the differential 32 shown in Figure 9 and the manner in which the power is taken to the wheels of the wheel assemblies is identical. Thus, as shown in Figure 15, the power input shaft 154 is journaled within a power input shaft receiving portion 150 and drives the large bevel gear 158 through a bevel gear 156 (not shown in Figure 15) in the same manner as the differential of Figure 9 is driven. The large bevel ring gear 158 drives its housing portion 160 which is non-rotatably secured thereto.

The planet type bevel gears 164 rotatably supported on the differential cross 163 drive the bevel gears 166 fixed to the transversely extending power output shafts 168 and 170 in a manner already described in connection with Figure 9. The differential 32' of Figure 15 differs from the differential 32 of Figure 9 in that a disc brake 300 has been added to the differential 32'. To provide for the disc brake 300, a brake housing receiving portion 302 has been formed on the cylindrical carrier 140' opposite the power input shaft 154 of the differential. This brake housing receiving portion 302 extends radially outward from the cylindrical differential carrier 140' in alignment with the power input shaft 154. A bearing support 304 is in abutting relation with the brake housing receiving portion 302. The bearing support 304 supports bearings 306 which rotatably receive the brake shaft 308. Shaft 308 carries a pinion 310 non-rotatably secured thereto. The pinion 310 is in meshing relation with the large bevel ring gear 158 of the differential. A brake housing 312 is secured to the brake housing receiving portion 302 by bolts 316 which also secure the bearing support 304. Brake element 314 is splined to shaft 308 so that the brake element 314 is rotatably secured to the shaft but is free to move axially of the shaft 308.

It will be appreciated that since the bevel gear 310 is in mesh with the large ring bevel gear 158, the brake shaft 308 rotates whenever the differential is receiving power through the power input shaft 154. The brake housing 312 is non-rotatably secured to the differential cylindrical carrier 140' so that there is no rotation of the brake housing 312. Thus, when a braking force is applied between the housing 312 and the brake element 314 a braking force is applied to shaft 308 and therefore to the large ring bevel gear 158.

The disc brake 300 is preferably of the type disclosed in and claimed in copending application Serial No. 706,481, filed December 31, 1957, entitled "Cooled Disc Brake," in which we are also joint inventors. That application discloses a disc brake which has a braking element 314 that carries two annular friction discs (not shown) on the opposite radial faces thereof. A hydraulically actuated piston forces the braking element 314 axially against the housing member to provide a braking force. Liquid coolant passages are provided for liquid cooling of the brake. For the purposes of the present invention, the exact construction of the type of brake to be utilized for applying a braking force to the differential is not critical. Any brake which provides a braking force between a fixed housing and a rotatable shaft may be utilized. While we preferably utilize the brake shown in copending application Serial No. 706,481 the characteristics of that brake are not an essential part of the present invention. Reference may be had to application Serial No. 706,481 for details of the preferred construction of the brake, however.

It will be appreciated that when a braking force is applied to disc brake 300 to apply a force between the shaft 308 and the housing 312, this braking force is transmitted to the opposite pair of wheel assemblies 38' through the transversely extending power output shafts 168 and 170 of the differential. Thus, the differential brake may be utilized to reduce the overall speed of the vehicle to which the wheel assemblies are fixed.

Figure 17:
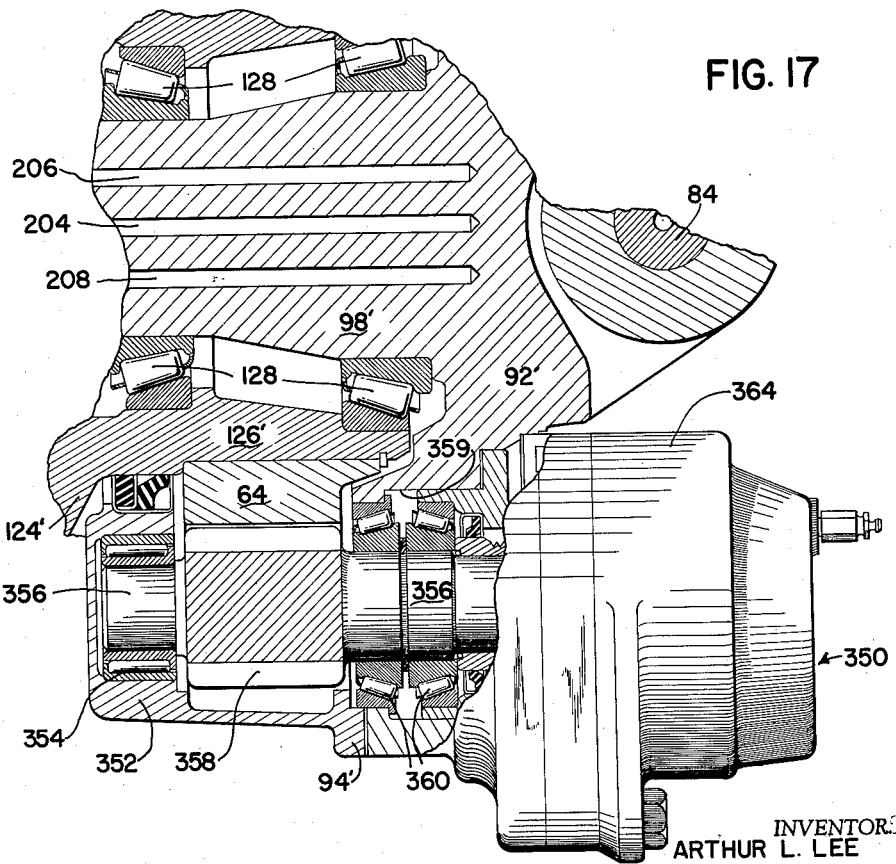
Figure 17 is a partial horizontal section, taken in the same plane as Figure 13, showing in detail the drive gearing and disc brake of Figure 16.

Referring now to Figures 16 and 17, Figure 16 shows a modified wheel assembly 38' with a disc brake 350 operatively associated with the drive gearing that drives the wheel body portion 124'. As described in connection with the configuration shown in Figures 5–9, the ring gear 64 is non-rotatably secured to the cylindrical hub portion 126 of the wheel body portion 124. This ring gear 64 receives driving power from the pinion gear 62 rotatably mounted below the ring gear 64 within the spindle bracket cover 94. Figure 17 shows in detail the modification required to operatively associate the disc brake 350 with the drive gearing of the wheel assembly 38'. Figure 17 is a partial section taken horizontally through the center of the spindle member 98'. As seen in Figure 17, the hydraulic passage 204 and the coolant passages 206 and 208 are shown in spindle member 98'. These passages are utilized with the disc brake 200 between the spindle and the wheel member. They are not a part of the system for the disc brake 350 operatively associated with the drive gearing for the wheel assembly 38'. The passages 204, 206 and 208 have other passages (not shown) communicating with them at right angles through the spindle bracket 92'. The installation of the disc brake 350 requires modification of the spindle bracket 92' and the spindle bracket cover 94'.

As shown in Figures 7 and 8 the previously described spindle bracket cover 94 has an outboard bearing support portion 114 formed at the bottom thereof. The modified spindle bracket cover 94' shown in Figure 17 has a second outboard bearing support portion 352 similar to outboard bearing support portion 114 and located 90° from the outboard bearing support portion 114. This second outboard bearing support portion 352 contains roller bearing 354 which rotatably supports the end of shaft 356 in the spindle bracket cover 94'. Shaft 356 has a pinion gear 358 non-rotatably secured thereto. The pinion gear 358 meshes with the ring gear 64 non-rotatably secured to the wheel body portion 124'. The gear 358 is located at a point 90° removed about the periphery of gear 64 from the pinion gear 62. A semi-cylindrical recess 359 is formed at the edge of spindle bracket 92' in axial alignment with the bearing support portion 352 of spindle bracket cover 94'. Bearings 360 are clamped in recess 359 by the brake housing 364 and, in turn, rotatably support the shaft 356 within the spindle bracket 92' and the brake housing 364. The brake housing 364 is non-rotatably secured to the modified spindle bracket 92' by bolts 362. The spindle bracket 92' is modified over the previously described spindle bracket 92 of Figure 5 to the extent that it provides a recess 359 for the shaft 356 and provides housing receiving portions to receive the housing 364 of the brake 350.

The brake 350 is also preferably of the type disclosed and claimed in patent application Serial No. 706,481. Here again, the exact construction of this brake is not a critical part of the present invention. The present invention contemplates any type of brake to provide an effective braking force between the shaft 356 and the spindle bracket 92'.

In operation, the ring gear 64 is driven by the pinion gear 62 which receives power from the differential 32. The gear 64 non-rotatably secured to the wheel body portion 124' thus rotates with the wheel whenever the vehicle is in motion. When it is desired to supply a braking force to the wheel body portion 124', the brake 350 may be engaged to supply a braking force to shaft 356 with respect to the spindle bracket 92'. Since pinion gear 358 is constantly in mesh with ring gear 64, any braking force applied to shaft 356 will tend to brake the rotation of the wheel body portion 124'.

A disc brake 200 operatively associated with the wheel itself, a disc brake 300 operatively associated with the differential and a disc brake 350 operatively associated with the drive gearing that drives the wheel of the wheel assembly, have all been described in detail. It will be appreciated that these individual braking elements may be utilized either alternately or simultaneously on a vehicle having the type of wheel assemblies disclosed and claimed in this application. When utilized simultaneously, brakes 300 and 350 may be utilized as secondary or preliminary brakes and brake 200 may be utilized as the main stopping brake. Thus, brakes 300 and 350 may be applied prior to the application of brake 200 so that the vehicle may be slowed by brakes 300 and 350 before brake 200 is applied. Further, only one of the brakes 300 or 350, for example the brake 300 operatively associated with the differential, may be utilized in combination with the brake 200 fixed to the main wheel assembly. In this case also, the brake 300 may be applied prior to application of the brake 200.

When all three brakes 200, 300 and 350 are utilized concurrently on the same vehicle the effective braking force is distributed at three remotely located points so that there is no area of high heat concentration. Thus, the three brakes may be effectively cooled by utilization of coolant systems or cooling fins.

The brakes 300 and 350 utilized in connection with the differential and the drive gearing to the wheel respectively, have the further advantage of being remotely located insofar as the main wheel assembly is concerned. Thus, these brakes are placed where they are in the open air and the surrounding air has a cooling effect upon the brakes. In this manner, the novel location of brakes 300 and 350 contributes to the overall efficiency of the vehicle braking system described herein.

According to the provisions of the patent statutes, we have explained the principle, preferred construction and mode of operation of our invention, and have illustrated and described what we now consider to represent its best embodiments. However, we desire to have it understood that, within the scope of the appended claims, the invention may be practiced otherwise than as specifically illustrated and described.

We claim:

1. In a power driven wheel assembly the combination comprising a supporting bracket having a body portion adapted to be attached to a vehicle frame, said supporting bracket body portion having a horizontal cylindrical bore therethrough, said horizontal cylindrical bore adapted to receive a driving shaft, a spindle bracket having a body portion and a spindle portion, said spindle portion extending horizontally from said body portion, said spindle bracket body portion having a horizontal cylindrical bore therethrough below said spindle portion and a horizontal, semi-cylindrical recess at one side of said spindle portion, said bore being adapted to support a portion of a power transmitting shaft, said recess adapted to support a portion of a brake shaft, said spindle bracket secured to said supporting bracket, a wheel member having an inwardly extending cylindrical hub portion adapted to be rotatably mounted on said spindle bracket spindle portion, said wheel member cylindrical hub portion having an external toothed ring gear mounted thereon and splined thereto, a spindle bracket cover member secured to said spindle bracket body portion and having a central aperture therethrough, said wheel hub portion extending through said spindle bracket cover member aperture, said cover member having a first shaft supporting portion below said central aperture, said cover member having a second shaft supporting portion to one side of said central aperture, said first cover member shaft supporting portion being axially aligned with said spindle bracket body portion horizontal bore, said second shaft supporting portion being axially aligned with said spindle bracket horizontal recess, a power transmitting shaft rotatably positioned in said first cover member shaft supporting portion and said spindle bracket horizontal bore, a first pinion gear secured to said transmitting shaft in meshing relation with said ring gear mounted on said wheel hub portion, a universal joint connecting means for connecting said power transmitting shaft to a driving shaft which is adapted to extend outwardly through said supporting bracket horizontal bore, a brake shaft rotatably positioned in said second cover member shaft supporting portion and said spindle bracket horizontal recess, a second pinion gear secured to said brake shaft in meshing relation with said ring gear mounted on said wheel hub portion, a brake housing fixedly secured to said spindle bracket in alignment with said spindle bracket horizontal recess, and brake means engageable to provide a braking force between said brake shaft and said brake housing.

2. In a power driven steerable wheel assembly the combination comprising a supporting bracket having a body portion adapted to be attached to a vehicle frame and a king pin receiving portion, said king pin receiving portion extending outwardly from and above said body portion, said king pin receiving portion having a vertical cylindrical bore therethrough, said supporting bracket body portion having a horizontal cylindrical bore therethrough below said king pin receiving portion, said horizontal cylindrical bore adapted to receive a driving shaft, said supporting bracket body portion having an inwardly extending recessed portion adapted to receive a cylindrical differential carrier therein, a spindle bracket having a body portion and a spindle portion, said spindle portion extending horizontally from said body portion, said spindle bracket body portion having a horizontal cylindrical bore therethrough below said spindle portion and a horizontal, semi-cylindrical recess at one side of said spindle portion, said last named bore being adapted to support a portion of a power transmitting shaft, said recess adapted to support a portion of a brake shaft, said spindle bracket body portion having a pair of spaced horizontal flange members extending therefrom, said flange members having aligned vertical apertures therethrough, said supporting bracket king pin receiving portion positioned between said spindle bracket flange members with said vertical cylindrical bore aligned with said flange member apertures, a king pin positioned in said aligned bore and apertures thereby pivotally supporting said spindle bracket on said supporting bracket, a wheel member having an inwardly extending cylindrical hub portion adapted to be rotatably mounted on said spindle bracket spindle portion, said cylindrical hub portion having an external toothed ring gear mounted thereon and splined thereto, a spindle bracket cover member secured to said spindle bracket body portion and having a central aperture therethrough, said wheel hub portion extending through said spindle bracket cover member central aperture, said cover member having a first shaft supporting portion below said central aperture, said cover member having a second shaft supporting portion to one side of said central aperture, said first cover member shaft supporting portion being axially aligned with said spindle bracket body portion horizontal bore, said second shaft supporting portion being axially aligned with said spindle bracket horizontal recess, a power transmitting shaft rotatably positioned in said first cover member shaft supporting portion and said spindle bracket horizontal bore, a first pinion gear secured to said transmitting shaft in meshing relation with said ring gear mounted on said wheel hub portion, and a universal joint connecting means for connecting said power transmitting shaft to said driving shaft which is adapted to extend outwardly through said supporting bracket horizontal bore, said universal means extending below said king pin in vertical alignment therewith, a brake shaft rotatably positioned in said second cover member shaft supporting portion and said spindle bracket horizontal recess, a second pinion gear secured to said brake shaft in meshing relation with said ring gear mounted on said wheel hub portion, a brake housing fixedly secured to said spindle bracket in alignment with said spindle bracket horizontal recess, and brake means engageable to provide a braking force between said brake shaft and said brake housing to thereby provide a braking force between said second pinion gear and said ring gear.

3. In a power driven wheel assembly the combination comprising a supporting bracket having a body portion adapted to be attached to a vehicle frame, said supporting bracket body portion having a horizontal cylindrical bore therethrough, said horizontal cylindrical bore adapted to receive a driving shaft, a spindle bracket having a body portion and a spindle portion, said spindle portion extending horizontally from said body portion and having a longitudinally extending hydraulic passage formed therein, said spindle bracket body portion having a horizontal cylindrical bore therethrough below said spindle portion, said bore being adapted to support a portion of a power transmitting shaft, said spindle bracket secured to said supporting bracket, a wheel member having a main body portion and an inwardly extending cylindrical hub portion adapted to be rotatably mounted on said spindle bracket spindle portion, said wheel member cylindrical hub portion having an external toothed ring gear mounted thereon and splined thereto, a spindle bracket cover member secured to said spindle bracket body portion and having a central aperture therethrough, said wheel hub portion extending through said spindle bracket cover member aperture, said cover member having a shaft supporting portion below said central aperture, said cover member shaft supporting portion being axially aligned with said spindle bracket body portion horizontal bore, a power transmitting shaft rotatably positioned in said cover member shaft supporting portion and said spindle bracket horizontal bore, a pinion gear secured to said transmitting shaft in meshing relation with said ring gear mounted on said wheel hub portion, and a universal joint connecting means for connecting said power transmitting shaft to a driving shaft which is adapted to extend outwardly through said supporting bracket horizontal bore, a brake housing fixedly secured to said wheel member main body portion for rotation therewith, brake means non-rotatably secured to said spindle portion but free to move axially thereof, hydraulic conduit means connecting said brake means with said hydraulic passage formed in said spindle portion, said brake means cooperating with said brake housing and said wheel body member to provide a braking force between said wheel member and said spindle portion when said brake means are actuated by hydraulic fluid under pressure in said hydraulic passage and said hydraulic conduit means.

4. In a power driven wheel assembly the combination comprising a supporting bracket having a body portion adapted to be attached to a vehicle frame, said supporting bracket body portion having a horizontal cylindrical bore therethrough, said horizontal cylindrical bore adapted to receive a driving shaft, a spindle bracket having a body portion and a spindle portion, said spindle portion extending horizontally from said body portion and having longitudinally extending hydraulic and coolant passages formed therein, said spindle bracket body portion having a horizontal cylindrical bore therethrough below said spindle portion, said bore being adapted to support a portion of a power transmitting shaft, said spindle bracket secured to said supporting bracket, a wheel member having a main body portion having coolant passages formed therein and an inwardly extending cylindrical hub portion adapted to be rotatably mounted on said spindle bracket spindle portion, said wheel member cylindrical hub portion having an external toothed ring gear mounted thereon and splined thereto, a spindle bracket cover member secured to said spindle bracket body portion and having a central aperture therethrough, said wheel hub portion extending through said spindle bracket cover member aperture, said cover member having a shaft supporting portion below said central aperture, said cover member shaft supporting portion being axially aligned with said spindle bracket body portion horizontal bore, a power transmitting shaft rotatably positioned in said cover member shaft supporting portion and said spindle bracket horizontal bore, a pinion gear secured to said transmitting shaft in meshing relation with said ring gear mounted on said wheel hub portion, and a universal joint connecting means for connecting said power transmitting shaft to a driving shaft which is adapted to extend outwardly through said supporting bracket horizontal bore, a brake housing having coolant passages formed therein fixedly secured to said wheel member main body portion so that said coolant passages in said brake housing communicate with said coolant passages in said wheel member main body portion, brake means non-rotatably secured to said spindle portion but free to move axially thereof, hydraulic conduit means connecting said brake means with said hydraulic passage, a conduit junction means connecting said coolant passages in said spindle member with said coolant passages in said brake housing, said brake means actuatable to provide a braking force between said wheel member and said spindle portion, and said coolant passages forming a continuous coolant conduit for circulating fluid coolant, through said brake housing and said wheel member body portion.

5. A wheel assembly comprising a horizontally disposed fixed spindle portion, said spindle portion having a longitudinally extending hydraulic passage formed therethrough, a wheel member having a main body portion and a cylindrical hub portion rotatably mounted on said spindle portion, a first annular friction disc mounted on a radial face of said body portion for rotation therewith, a brake housing secured to said wheel member main body portion, a second annular friction disc mounted on a radial face of said brake housing for rotation therewith, a first brake disc having an annular recess formed therein non-rotatably secured to said spindle portion but free to move axially thereof, a third annular friction disc fixedly secured to a radial face of said first brake disc, a second brake disc non-rotatably secured to said first brake disc, but free to move axially thereof, a fourth annular friction disc fixedly secured to said second brake disc, an annular piston disposed within said annular recess of said first brake disc, said annular piston in abutting relation to said second brake disc, biasing means biasing said first and second brake discs toward each other, conduit means placing said hydraulic passage in fluid communication with said annular recess in said first brake disc, said piston being effective to separate said first and second brake discs in an axial direction and thereby to force said third friction disc into contact with said first friction disc and to force said fourth friction disc into contact with said second friction disc when hydraulic fluid under pressure is admitted into said hydraulic passage.

6. A wheel assembly comprising a horizontally disposed fixed spindle portion, said spindle portion having longitudinally extending hydraulic and coolant passages formed therein, a wheel member having a main body portion and a cylindrical hub portion rotatably mounted on said spindle portion, a first annular friction disc mounted on a radial face of said body portion for rotation therewith, coolant passages formed in said body portion such that liquid coolant in said passages directly contacts said first friction disc, a brake housing secured to said wheel member main body portion for rotation therewith, a second annual friction disc mounted on a radial face of said brake housing for rotation therewith, coolant passages formed in said brake housing such that liquid coolant in said passages directly contacts said second friction disc, said coolant passages in said brake housing communicating with said coolant passages in said wheel member main body portion, a first brake disc having an annular recess formed therein non-rotatably secured to said spindle portion but free to move axially thereof, a third annular friction disc fixedly secured to a radial face of said first brake disc, a second brake disc non-rotatably secured to said first brake disc but free to move axially thereof, a fourth annular friction disc fixedly secured to said second brake disc, an annular piston disposed within said annular recess of said first brake disc, said annular piston in abutting relation to said second brake disc, biasing means biasing said first and second brake discs toward each other, conduit junction means fixed to the end of said spindle portion, said conduit junction means providing fluid communication between said coolant passages in said brake housing and said coolant passages in said spindle portion, said conduit junction means also placing said hydraulic passage in said spindle portion into fluid communication with said annular recess in said first brake disc, said coolant passages forming a continuous coolant conduit to circulate liquid coolant through said brake housing and said wheel body portion, and said piston being effective to separate said first and second brake discs in an axial direction and thereby to force said third friction disc into contact with said first friction disc and to force said fourth friction disc into contact with said second friction disc when hydraulic fluid under pressure is admitted into said hydraulic passage.

7. In a power driven steerable wheel assembly the combination comprising a supporting bracket having a body portion adapted to be attached to a vehicle frame and a king pin receiving portion, said king pin receiving portion extending outwardly from and above said body portion, said king pin receiving portion having a vertical cylindrical bore therethrough, said supporting bracket body portion having a horizontal cylindrical bore therethrough below said king pin receiving portion, said horizontal cylindrical bore adapted to receive a shaft, said supporting bracket body portion having an inwardly extending recessed portion adapted to receive a cylindrical differential carrier therein, a cylindrical differential carrier, a differential having transverse power output shafts positioned in said carrier, said differential including a large bevel ring gear journaled for rotation within said carrier about the axis of said carrier and driven by a meshing bevel gear non-rotatably secured to the differential power input shaft, a brake housing receiving portion formed on said differential carrier and extending radially therefrom, a first brake shaft mounted for rotation within said brake housing receiving portion, said first brake shaft having a pinion bevel gear non-rotatably fixed thereto in meshing relation with said large ring bevel gear, a first brake housing fixed to said brake housing receiving portion, first brake means engageable to provide a braking force between said first brake shaft and said first brake housing, said differential carrier positioned in said supporting bracket recessed portion, a spindle bracket having a body portion and a spindle portion, said spindle portion extending horizontally from said body portion, and having longitudinally extending hydraulic and coolant passages formed therein, said spindle bracket body portion having a horizontal cylindrical bore therethrough below said spindle portion, and a horizontal, semi-cylindrical recess at one side of said spindle portion, said last named bore being adapted to support a portion of a power transmitting shaft, said recess adapted to support a portion of a second brake shaft, said spindle bracket body portion having a pair of spaced horizontal flange members extending therefrom, said flange members having aligned vertical apertures therethrough, said supporting bracket king pin receiving portion positioned between said spindle bracket flange members with said vertical cylindrical bore aligned with said flange member apertures, a king pin positioned in said aligned bore and apertures thereby pivotally supporting said spindle bracket on said supporting bracket, a wheel member having a main body portion having coolant passages formed therein and an inwardly extending cylindrical hub portion adapted to be rotatably mounted on said spindle bracket spindle portion, said cylindrical hub portion having an external toothed ring gear mounted thereon and splined thereto, a spindle bracket cover member secured to said spindle bracket body portion and having a central aperture therethrough, said wheel hub portion extending through said spindle bracket cover member central aperture, said cover member having a first shaft supporting portion below said central aperture, said cover member having a second shaft supporting portion to one side of said central aperture, said first cover member shaft supporting portion being axially aligned with said spindle bracket body portion horizontal bore, said second shaft supporting portion being axially aligned with said spindle bracket horizontal recess, a power transmitting shaft rotatably positioned in said first cover member shaft supporting portion and said spindle bracket horizontal bore, a first pinion gear secured to said transmitting shaft in meshing relation with said ring gear mounted on said wheel hub portion, a universal joint connecting means for connecting said power transmitting shaft to one of said differential transverse power output shafts which is adapted to extend outwardly through said supporting bracket horizontal bore, said universal means extending below said king pin in vertical alignment therewith, a second brake shaft rotatably positioned in said second cover member shaft supporting portion and said spindle bracket horizontal recess, a second pinion gear secured to said second brake shaft in meshing relation with said ring gear mounted on said wheel hub portion, a second brake housing fixedly secured to said spindle bracket in alignment with said spindle bracket horizontal recess, second brake means engageable to provide a braking force between said second brake shaft and said second brake housing, a third brake housing having coolant passages formed therein fixedly secured to said wheel member main body portion so that said coolant passages in said third brake housing communicate with said coolant passages in said wheel member main body portion, third brake means non-rotatably secured to said spindle portion but free to move axially thereof, hydraulic conduit means connecting said third brake means with said hydraulic passage, a conduit junction means connecting said coolant passages in said spindle member with said coolant passages in said third brake housing, said third brake means actuatable to provide a braking force between said wheel member and said spindle portion, and said coolant passages forming a continuous coolant conduit for circulating fluid coolant through said third brake housing and said wheel member body portion.

8. In a power driven steerable wheel assembly the combination comprising a supporting bracket having a body portion adapted to be attached to a vehicle frame and a king pin receiving portion, said king pin receiving portion extending outwardly from and above said body portion, said king pin receiving portion having a vertical cylindrical bore therethrough, said supporting bracket body portion having a horizontal cylindrical bore therethrough below said king pin receiving portion, said horizontal cylindrical bore adapted to receive a shaft, said supporting bracket body portion having an inwardly extending recessed portion adapted to receive a cylindrical differential carrier therein, a cylindrical differential carrier, a differential having transverse power output shafts positioned in said carrier, said differential including a large bevel ring gear journaled for rotation within said carrier about the axis of said carrier and driven by a meshing bevel gear non-rotatably secured to the differential power input shaft, a brake housing receiving portion formed on on said differential carrier and extending radially therefrom, a first brake shaft mounted for rotation within said brake housing receiving portion, said first brake shaft having a pinion bevel gear non-rotatably fixed thereto in meshing relation with said large ring bevel gear, a first brake housing fixed to said brake housing receiving portion, first brake means engageable to provide a braking force between said first brake shaft and said first brake housing, said differential carrier positioned in said supporting bracket recessed portion, a spindle bracket having a body portion and a spindle portion, said spindle portion extending horizontally from said body portion, said spindle bracket body portion having a horizontal cylindrical bore therethrough below said spindle portion and a horizontal, semi-cylindrical recess at one side of said spindle portion, said last named bore being adapted to support a portion of a power transmitting shaft, said recess adapted to support a portion of a second brake shaft, said spindle bracket body portion having a pair of spaced horizontal flange members extending therefrom, said flange members having aligned vertical apertures therethrough, said supporting bracket king pin receiving portion positioned between said spindle bracket flange members with said vertical cylindrical bore aligned with said flange member apertures, a king pin positioned in said aligned bore and apertures thereby pivotally supporting said spindle bracket on said supporting bracket, a wheel member having an inwardly extending cylindrical hub portion adapted to be rotatably mounted on said spindle bracket spindle portion, said cylindrical hub portion having an external toothed ring gear mounted thereon and splined thereto, a spindle bracket cover member secured to said spindle bracket body portion and having a central aperture therethrough, said wheel hub portion extending through said spindle bracket cover member central aperture, said cover member having a first shaft supporting portion below said central aperture, said cover member having a second shaft supporting portion to one side of said central aperture, said first cover member shaft supporting portion being axially aligned with said spindle bracket body portion horizontal bore, said second shaft supporting portion being axially aligned with said spindle bracket horizontal recess, a power transmitting shaft rotatably positioned in said first cover member shaft supporting portion and said spindle bracket horizontal bore, a first pinion gear secured to said transmitting shaft in meshing relation with said ring gear mounted on said wheel hub portion, a universal joint connecting means for connecting said power transmitting shaft to one of said differential transverse power output shafts which is adapted to extend outwardly through said supporting bracket horizontal bore, said universal means extending below said king pin in vertical alignment therewith, a second brake shaft rotatably positioned in said second cover member shaft supporting portion and said spindle bracket horizontal recess, a second pinion gear secured to said second brake shaft in meshing relation with said ring gear mounted on said wheel hub portion, a second brake housing fixedly secured to said spindle bracket in alignment with said spindle bracket horizontal recess, and second brake means engageable to provide a braking force between said second brake shaft and said second brake housing.

9. In a power driven steerable wheel assembly the combination comprising a supporting bracket having a body portion adapted to be attached to a vehicle frame and a king pin receiving portion, said king pin receiving portion extending outwardly from and above said body portion, said king pin receiving portion having a vertical cylindrical bore therethrough, said supporting bracket body portion having a horizontal cylindrical bore therethrough below said king pin receiving portion, said horizontal cylindrical bore adapted to receive a driving shaft, said supporting bracket body portion having an inwardly extending recessed portion adapted to receive a cylindrical differential carrier therein, a spindle bracket having a body portion and a spindle portion, said spindle portion extending horizontally from said body portion, and having longitudinally extending hydraulic and coolant passages formed therein, said spindle bracket body portion having a horizontal cylindrical bore therethrough below said spindle portion and a horizontal, semi-cylindrical recess at one side of said spindle portion, said last named bore being adapted to support a portion of a power transmitting shaft, said recess adapted to support a portion of a first brake shaft, said spindle bracket body portion having a pair of spaced horizontal flange members extending therefrom, said flange members having aligned vertical apertures therethrough, said supporting bracket king pin receiving portion positioned between said spindle bracket flange members with said vertical cylindrical bore aligned with said flange member apertures, a king pin positioned in said aligned bore and apertures thereby pivotally supporting said spindle bracket on said supporting bracket, a wheel member having a main body portion having coolant passages formed therein and an inwardly extending cylindrical hub portion adapted to be rotatably mounted on said spindle bracket spindle portion, said cylindrical hub portion having an external toothed ring gear mounted thereon and splined thereto, a spindle bracket cover member secured to said spindle bracket body portion and having a central aperture therethrough, said wheel hub portion extending through said spindle bracket cover member central aperture, said cover member having a first shaft supporting portion below said central aperture, said cover member having a second shaft supporting portion to one side of said central aperture, said first cover member shaft supporting portion being axially aligned with said spindle bracket body portion horizontal bore, said second shaft supporting portion being axially aligned with said spindle bracket horizontal recess, a power transmitting shaft rotatably positioned in said first cover member shaft supporting portion and said spindle bracket horizontal bore, a first pinion gear secured to said transmitting shaft in meshing relation with said ring gear mounted on said wheel hub portion, a universal joint connecting means for connecting said power transmitting shaft to said driving shaft which is adapted to extend outwardly through said supporting bracket horizontal bore, said universal means extending below said king pin in vertical alignment therewith, a first brake shaft rotatably positioned in said second cover member shaft supporting portion and said spindle bracket horizontal recess, a second pinion gear secured to said first brake shaft in meshing relation with said ring gear mounted on said wheel hub portion, a first brake housing fixedly secured to said spindle bracket in alignment with said spindle bracket horizontal recess, first brake means engageable to provide a braking force between said first brake shaft and said first brake housing, a second brake housing having coolant passages formed therein fixedly secured to said wheel member main body portion so that said coolant passages in said second brake housing communicate with said coolant passages in said wheel member main body portion, second brake means non-rotatably secured to said spindle portion but free to move axially thereof, hydraulic conduit means connecting said second brake means with said hydraulic passage, a conduit junction means connecting said coolant passages in said spindle member with said coolant passages in said second brake housing, said second brake means actuatable to provide a braking force between said wheel member and said spindle portion, and said coolant passages forming a continuous coolant conduit for circulating fluid coolant through said second brake housing and said wheel member body portion.

10. In a power driven steerable wheel assembly the combination comprising a supporting bracket having a body portion adapted to be attached to a vehicle frame and a king pin receiving portion, said king pin receiving portion extending outwardly from and above said body portion, said king pin receiving portion having a vertical cylindrical bore therethrough, said supporting bracket body portion having a horizontal cylindrical bore therethrough below said king pin receiving portion, said horizontal cylindrical bore adapted to receive a shaft, said supporting bracket body portion having an inwardly extending recessed portion adapted to receive a cylindrical differential carrier therein, a cylindrical differential carrier, a differential having transverse power output shafts positioned in said carrier, said differential including a large bevel ring gear journaled for rotation within said carrier about the axis of said carrier and driven by a meshing bevel gear non-rotatably secured to the differential power input shaft, a brake housing receiving portion formed on said differential carrier and extending radially therefrom, a first brake shaft mounted for rotation within said brake housing receiving portion, said first brake shaft having a pinion bevel gear non-rotatably fixed thereto in meshing relation with said large ring bevel gear, a first brake housing fixed to said brake housing receiving portion, first brake means engageable to provide a braking force between said first brake shaft and said first brake housing, said differential carrier positioned in said supporting bracket recessed portion, a spindle bracket having a body portion and a spindle portion, said spindle portion extending horizontally from said body portion and having longitudinally extending hydraulic and coolant passages formed therein, said spindle bracket body portion having a horizontal cylindrical bore therethrough below said spindle portion, said last named bore being adapted to support a portion of a power transmitting shaft, said spindle bracket body portion having a pair of spaced horizontal flange members extending therefrom, said flange members having aligned vertical apertures therethrough, said supporting bracket king pin receiving portion positioned between said spindle bracket flange members with said vertical cylindrical bore aligned with said flange member apertures, a king pin positioned in said aligned bore and apertures thereby pivotally supporting said spindle bracket on said supporting bracket, a wheel member having a main body portion having coolant passages formed therein and an inwardly extending cylindrical hub portion adapted to be rotatably mounted on said spindle bracket spindle portion, said cylindrical hub portion having an external toothed ring gear mounted thereon and splined thereto, a spindle bracket cover member secured to said spindle bracket body portion and having a central aperture therethrough, said wheel hub portion extending through said spindle bracket cover member central aperture, said cover member having a shaft supporting portion below said central aperture, said cover member shaft supporting portion being axially aligned with said spindle bracket body portion horizontal bore, a power transmitting shaft rotatably positioned in said cover member shaft supporting portion and said spindle bracket horizontal bore, a pinion gear secured to said transmitting shaft in meshing relation with said ring gear mounted on said wheel hub portion, a universal joint connecting means for connecting said power transmitting shaft to one of said differential transverse power output shafts which is adapted to extend outwardly through said supporting bracket horizontal bore, said universal means extending below said king pin in vertical alignment therewith, a second brake housing having coolant passages formed therein fixedly secured to said wheel member main body portion so that said coolant passages in said second brake housing communicate with said coolant passages in said wheel member main body portion, second brake means non-rotatably secured to said spindle portion but free to move axially thereof, hydraulic conduit means connecting said second brake means with said hydraulic passage, a conduit junction means connecting said coolant passages in said spindle member with said coolant passages in said second brake housing, said second brake means actuatable to provide a braking force between said wheel member and said spindle portion, and said coolant passages forming a continuous coolant conduit for circulating fluid coolant through said second brake housing and said wheel member body portion.

References Cited in the file of this patent

UNITED STATES PATENTS

| | | |
|---|---|---|
| 1,644,707 | Blackmore | Oct. 11, 1927 |
| 1,922,962 | Lambert | Aug. 15, 1933 |
| 2,148,818 | Kattwinkel | Feb. 28, 1939 |
| 2,683,504 | Martin | July 13, 1954 |
| 2,866,525 | Bauer | Dec. 30, 1958 |
| 2,924,288 | Lee | Feb. 9, 1960 |